June 23, 1931. L. STINSON 1,811,218
CARBONATING APPARATUS
Filed July 31, 1930 2 Sheets-Sheet 1
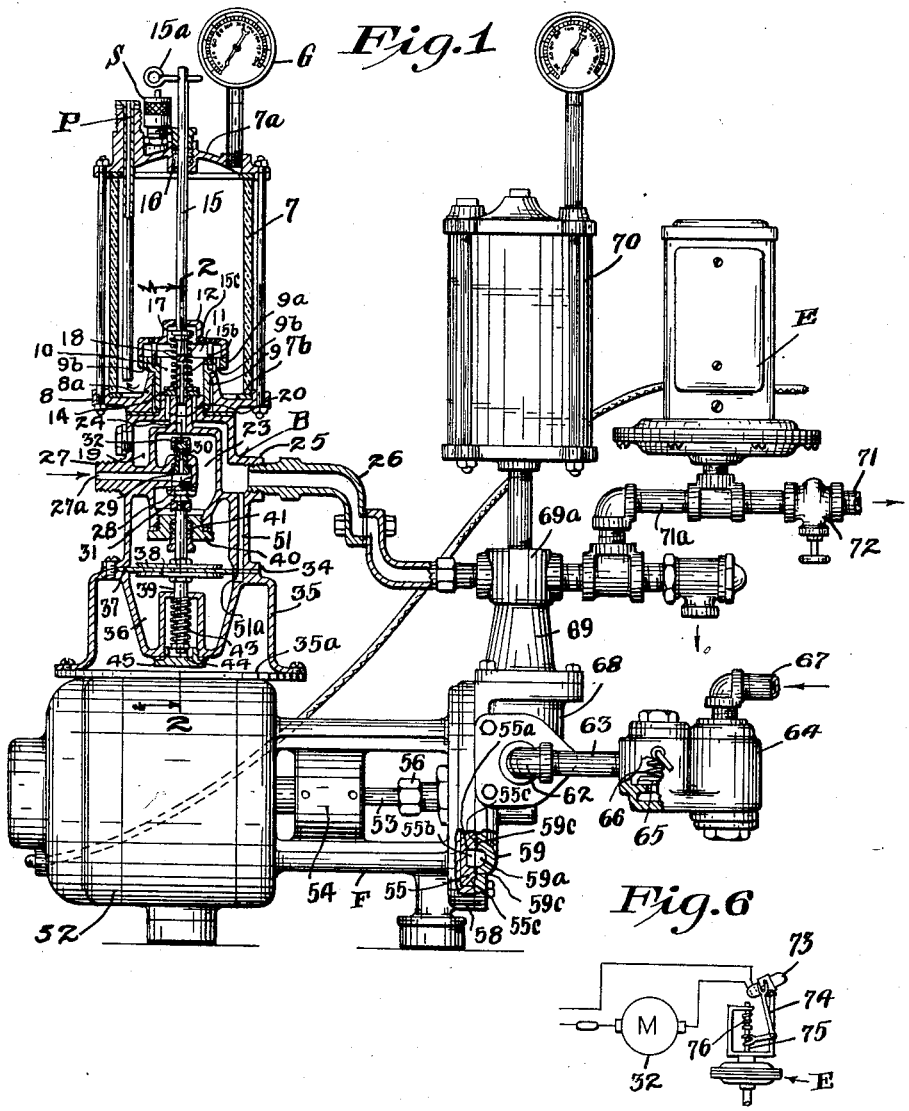
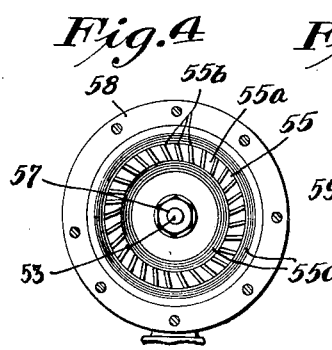
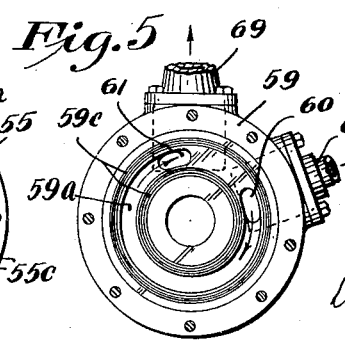
Inventor
Leslie Stinson
By his Attorneys
Williamson
Williamson June 23, 1931. L. STINSON 1,811,218
CARBONATING APPARATUS
Filed July 31, 1930 2 Sheets-Sheet 2
Fig.2
Fig.3
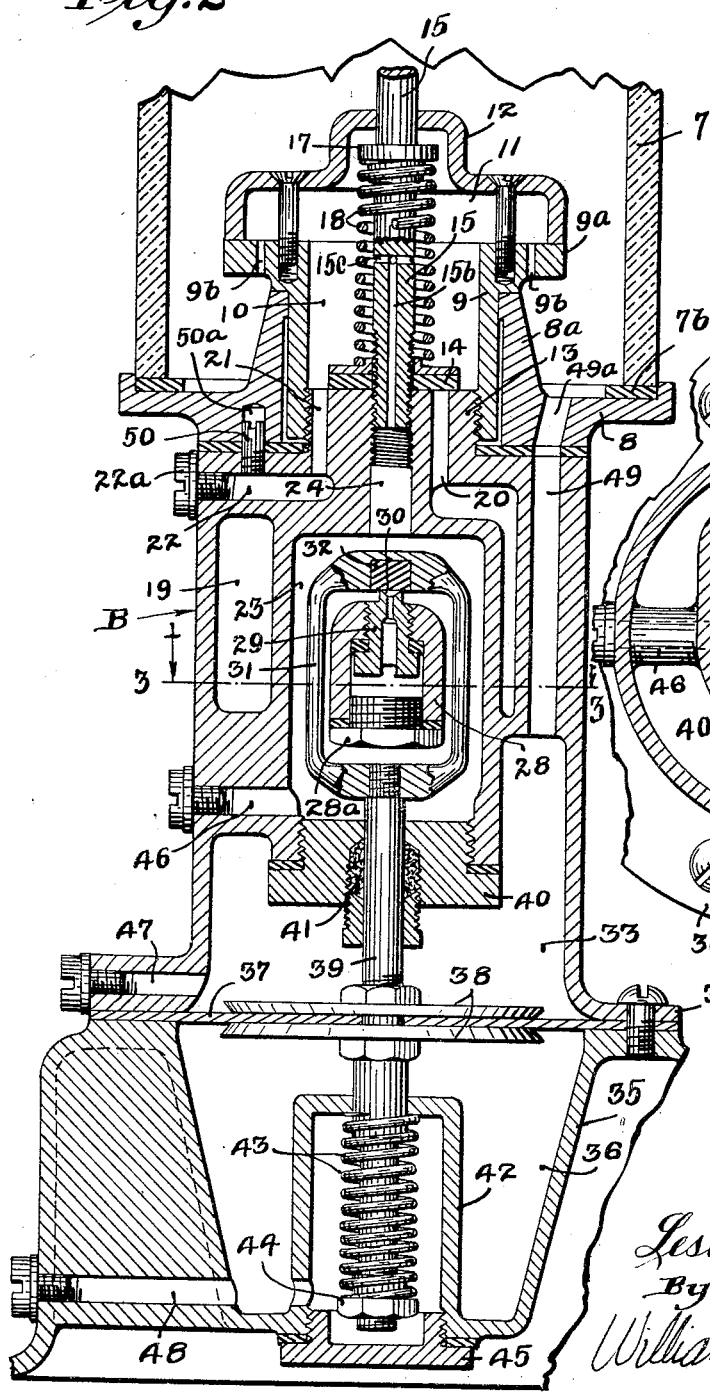
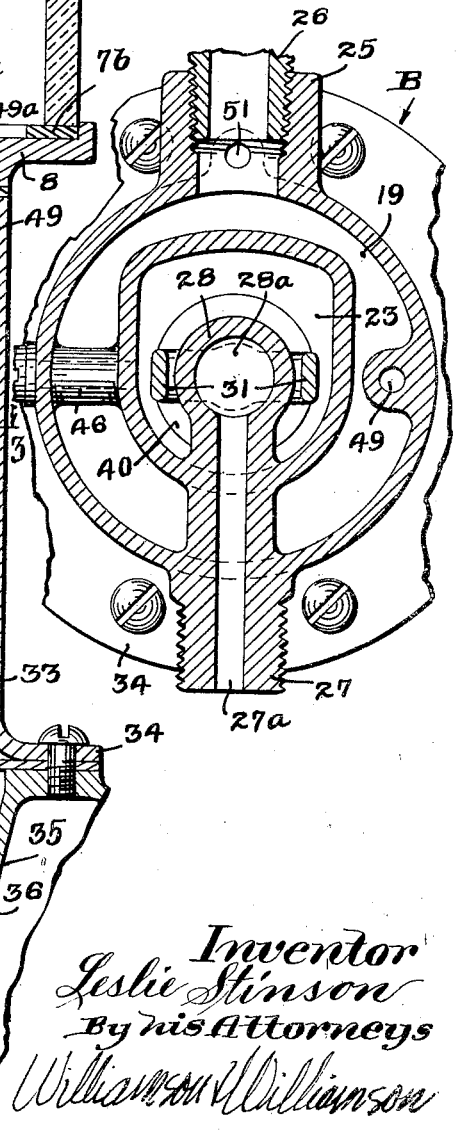
Inventor
Leslie Stinson
By his Attorneys
Williamson & Williamson Patented June 23, 1931

1,811,218

UNITED STATES PATENT OFFICE

LESLIE STINSON, OF GRAND FORKS, NORTH DAKOTA

CARBONATING APPARATUS

Application filed July 31, 1930. Serial No. 471,951.

This invention relates to automatic apparatus for impregnating water or other liquids with gas and especially is adapted for carbonating water supplied to soda fountains and the like.

My present invention is an improvement upon the invention disclosed in U. S. Letters Patent No. 1,500,283 granted to Hugh S. Stinson on July 8th, 1924 and also upon the invention disclosed in U. S. Letters Patent No. 1,713,787 granted May 21st, 1929 to myself and Hugh S. Stinson as joint inventors and assigned to The Stinson Carbonator Co., of Grand Forks, North Dakota. The said prior patents disclosed a successful, self-contained apparatus connected with a water supply and a drum containing gas, operative to supply the requisite quantity of gas for properly impregnating the water or liquid, the gas supply being automatically regulated by the withdrawal of the carbonated water or impregnated liquid from the apparatus irrespective of variations within certain limits in the pressures of the liquid and gas supplies. The supply of gas was regulated by the resultant effect obtained by the balancing of the pressure of the water supply with the pressure of fluid within the tank, the predominant pressure controlling the opening and closing of the gas supply valve.

Said apparatus was efficient in all installations where the fluctuation of water supply pressure was relatively small, but in small communities and in domestic or home water supply systems where often the pressure of the water supply varies up to forty pounds per square inch, the device did not, of course, function perfectly in carbonating the water and in utilizing the minimum amount of gas for so doing.

It is an object of my present invention to provide comparatively simple, economical and highly efficient carbonating apparatus which will operate efficiently, utilizing a minimum amount of gas, regardless of very wide fluctuations in the pressure of the water supply, which apparatus or system may also be utilized for other domestic purposes, such as pumping or circulating water or other liquids.

More specifically it is an object of my invention to provide a system including connections with a pressure water supply and a supply of gas under pressure, wherein the supply of water to the mixing elements is maintained at a substantially uniform pressure, wherein the means for producing the last mentioned result are only operative when the pressure of the water supply is below a pre-determined point, permitting the water or liquid from the supply to pass comparatively unrestricted into the mixing portion of the system when the water supply pressure is normal.

A further object is to provide a system for impregnating liquids with gas wherein an efficient, compact type of pump closely cooperates with pressure controlled mixing mechanism and pressure controlled circuit closing mechanism for effecting a successful unitary result, and attaining the objects previously set forth.

Another object is to provide improved apparatus of the class described wherein the several working parts will function accurately and smoothly and wherein adjustments of the water supply valve to the mixer and gas supply valve may be conveniently effected and wherein the connections and conduits will be simplified and the float valve eliminated.

A still further object is to provide a system of the type described, wherein the pump, valves, and all working mechanisms of the system through which water passes are entirely free from oils, grease or other lubricants.

These and other objects and advantages of the invention will be fully set forth in the following description made in connection with the accompanying drawings, in which like reference characters refer to similar parts throughout the several views, and in which:—

Fig. 1 is a view mostly in side elevation showing, however, my mixing mechanism and pressure actuated gas control mechanism in vertical section;

Fig. 2 is a vertical section taken substantially on the line 2—2 of Fig. 1 showing the mixing chamber, water supply valve and pressure actuated means for regulating the gas supply;

Fig. 3 is a cross section taken on the line 3—3 of Fig. 2;

Fig. 4 is a plan view looking into one of the sections of the pump casing and showing the pump rotor or impeller mounted therein;

Fig. 5 is a similar view looking into the other section of the pump casing and showing the race-way or groove formed therein to permit the unrestricted flow of the liquid through the pump when the pump is not in operation, and Fig. 6 is an electrical diagram illustrating the pressure actuated control circuit for starting and stopping the operation of the pump motor.

In the form of my invention illustrated in the drawings the system or apparatus comprises three essential working mechanisms, namely, the mixing or carbonating mechanism for accurately controlling the admixture of gas and liquid, a pressure actuated circuit breaker and an electrically driven pump, the operation of which is controlled by said circuit breaker and which, in the form shown in the drawings, also acts as a base or support for the other parts.

My mechanism for controlling the admixture of gas and liquid is in a general way similar to the devices disclosed in said herein identified U. S. Letters Patent and includes a preferably transparent cylindrical tank or receptacle 7 closed at its upper end by means of a top 7a from which a suitable pressure gauge G, a safety valve S and a draft or discharge pipe P are supported, said discharge pipe depending within said tank and extending to a point adjacent the bottom thereof. Tank 7 is closed at its lower end by a circular bottom member 8, the transparent tank member being clamped between bottom 8 and the top 7a, suitable packing being provided to insure an air tight joint between the parts. Bottom member 8 carries a concentric upstanding sleeve or hollow boss 8a which has nested therein a flanged sleeve 9 which defines a cylindrical chamber 10 disposed within the bottom and central portion of tank 7, said chamber communicating at its upper end with a mixing chamber 11 provided by a bossed cap 12, the lower end of which is tightly clamped against the out-turned flange 9a of sleeve 9. The lower end of sleeve 9 is provided with internal threads which engage an upwardly projecting screw-threaded extension 13 of the body or casting B. It will be seen that the tank may be clamped to the body B by screwing the flanged sleeve 9 tightly against the upper edge of the bossed portion of bottom 8. The upper end of extension 13 forms a smooth valve seat which is engaged by a disk water-supply valve 14 slidable longitudinally upon a vertical stem or shaft 15 which is threadedly connected with the central portion of extension 13 and which extends concentrically through chamber 10, through boss cap 12, through tank 7 and through the top 7a of the tank, a suitable packing gland 16 being formed in top 7a to prevent leakage of fluid from the tank. Stem 15 is provided adjacent its lower end with a set collar 17 and an elastic element, such as a coiled spring 18, surrounds said stem and is interposed between collar 17 and the top of valve 14. The tension on coiled spring 18 may be adjusted by turning stem 15 in the threaded socket provided at its lower end by the body extension 13. The turning of the stem varies the vertical position of the set collar 17 and its turning may be facilitated by means of a handle or key 15a removably interposed in the upper end of stem 15 which projects above the packing gland 16.

The body or casting B is provided with an annular water passage or chamber 19 which communicates at its upper end with chamber 10, through a series of vertical ports 20 extending through the casting extension 13 and disposed below valve 14. A drain passage 21 (see Fig. 2) communicates at its upper end with chamber 10 at the outer edge of valve 14 and connects with a horizontal drain port 22 having a plug or closure member 22a threaded therein. Within the central portion of casting or body B a gas-valve-containing chamber 23 is provided, the upper end of said chamber communicating with an axial passage 24 through the casting extension 13. The passage 24 at its upper end forms the threaded socket for receiving the stem 15 previously described and the lower portion of the stem is provided with an axial passage 15b communicating at its lower end with passage 24 and at its upper end with a series of laterally disposed discharge ports 15c communicating with the chamber 10. At one side of the casting or body B, I provide a connection 25 into which is tapped a water supply pipe 26 from the pump. Connection 25 communicates with the annular water chamber or passage 19. The opposite side of body or casting B is provided with a connection 27 adapted to be coupled with a drum or other supply of gas under pressure. A horizontal gas passage 27a extends radially into the center of valve-containing chamber 23 and terminates in a hollow head 28 closed at its lower end by a suitable plug 28a and having screw threaded in its upper end a flanged nipple 29 which terminates in an upwardly projecting sharp annular valve seat 30. Suitable packing is interposed between the flange of nipple 29 and head 28 and between the flange of plug 28a and its seat.

The gas supply is normally cut off from the interior of the tank 7 by means of a pressure regulated valve 31 which may comprise an annular member loosely surrounding the hollow gas head 28 and carrying in its upper portion a valve element or seal 32 which is normally seated against the sharp valve seat 30 at the upper end of nipple 29. Valve 31 is of smaller external dimensions than the valve-containing chamber 23, affording access of gas through the chamber into the axial passage 24. The lower portion of the body or casting B is hollow affording an enlarged pressure chamber 33 and an outturned attachment flange 34 is rigidly secured to a suitable hollow base 35, said base having a relatively large pressure chamber 36 in the upper portion thereof of substantially similar diameter to the pressure chamber 33 in body B. A suitable diaphragm 37 is clamped between flange 34 and the top of base 35, an air tight joint being provided between the said parts. The central portion of the diaphragm 37 is clamped between a pair of disks 38, said disks and diaphragm having attached thereto a vertical stem 39 to the upper end of which the annular valve 31 is secured. A large plug 40 closes the lower end of valve-containing chamber 23. Suitable packing is provided between said plug and its seat and a packing gland 41 is provided between the stem 39 and plug 40. The lower end of stem 39 projects through a cage 42 centrally disposed in the bottom of base 35 and a coiled spring 43 surrounds the lower end of stem 39 and is interposed between the upper portion of cage 42 and an adjustment nut 44 threadedly secured to the lower extremity of said stem. Adjustment nut 44 is accessible through a central opening in the bottom of base 35 and a plug 45 closes said opening, suitable packing means being provided.

A plug-equipped drain 46 is provided for draining the gas-valve-containing chamber 23 and a similar plug-equipped drain passage 47 is provided in casting B for draining the pressure chamber 33 above diaphragm 37. Another plug-equipped drain passage 48 is provided for draining the pressure chamber 36 below the diaphragm.

Pressure chamber 33 disposed above the diaphragm 37 communicates with the interior of tank 7 by means of a substantially vertical passage 49 formed in the casting or body B and said passage registers with a slightly inclined passage 49a formed in the bottom member 8 for the tank. The passages 49a and 49 are accurately aligned when the device is assembled and this is facilitated by means of a pin or screw 50 threaded into the opposite portion of the top of casting B, the end thereof projecting for disposition within a socket 50a formed in the tank bottom 8. Obviously passages 49 and 49a subject the upper side of diaphragm 37 to the pressure within tank 7.

The pressure chamber 36 disposed below diaphragm 37 is connected with the annular water passage or chamber 19 by means of a small vertical passage 51 formed in body or casting B, said passage communicating with an angle port 51a (see Fig. 1) extending through the clamped portion of diaphragm 37 and through the flange at the top of base 35. Passage 51 and port 51a obviously subject the lower side of diaphragm 37 to the pressure of the water or liquid entering the carbonation controlling apparatus.

The carbonating mechanism or apparatus for controlling the admixing of gas and liquid may be conveniently mounted upon the motor casing 52 of my electrically driven pump. If desired the bottom plate 35a for the base 35 may be bolted or spot-welded to the motor casing 52, the admixing apparatus projecting substantially vertically. The armature shaft 53 of the pump motor projects horizontally some distance beyond the motor casing and is journaled in a suitable bearing 54 and carries at its outer end the rotor or impeller 55 of my pump. A rigid frame F supported on suitable legs connects the motor casing with the pump casing and a suitable packing gland 56 is provided to prevent leakage between the casing and the shaft 53.

The impeller 55 of my pump comprises a disk having in its outer face a groove 55a wherein are mounted a series of spaced impeller blades 55b traversing said groove and terminating at their outer edges in a plane substantially co-incident with the plane of said outer face. The several plates 55b are canted or inclined slightly from radial position with reference to the disk. Impeller 55 may be fixed to shaft 53 in any suitable manner, such as by a clamping nut 57 threadedly engaging the diminished end of said shaft. Impeller 55 rotates within a hollow drum or shell 58 forming half of the pump casing and a second drum or shell 59 is clamped to drum 58, registering flanges on said drums being provided through which clamping bolts may be inserted. Drum 59 has a concentric major arcuate groove 59a in the face thereof and of substantially the width of annular groove 55a formed in impeller 55. One end of an intake passage 60 communicates with one end of groove 59a and a discharge passage 61 communicates with the opposite end of said groove. It will be noticed that groove 59a is not annular, inasmuch as the two ends thereof are spaced a relatively short distance apart. The face of impeller 55 carries two series of annular sealing ridges or rings 55c which may be integrally formed therewith and the face of drum 59 carries cooperating annular sealing ridges or rings 59c which are accurately formed to interfit with and be slightly spaced from the surfaces of ridges 55c when the pump is assembled. The intake passage 60 of the pump communicates with an intake connection 62 said connection being connected by a conduit 63, as shown, with a casting 64, which may have a strainer (not shown) mounted in one portion thereof and an efficient check valve 65 mounted in another portion thereof. Check valve 65 is yieldingly held against its seat by a coiled spring 66 which may surround the stem of valve 65. The strainer portion of casting 64 may be connected with a liquid supply pipe 67 or other source of water or liquid under pressure. The discharge passage 61 of the pump communicates with a discharge connection 68 to which may be attached a hollow base 69 of a suitable air dome or air cushion 70, base 69 also serving as a conduit and including a chamber 69a at its upper end which is connected with conduit 26 communicating with the annular water passage or chamber 19 of the carbonating mechanism. Said chamber 69a also communicates by means of a connection 71a with a pressure chamber formed at the under side of the diaphragm of a suitable pressure actuated electrical circuit breaking mechanism designated as an entirety by the letter E. Connection 71a may also communicate with a supply pipe 71 which may connect with a tank or with a device for utilizing water or liquid. A valve 72 is interposed in connection 71.

The diagram shown in Fig. 6 shows a suitable electrical circuit for operating the pump motor, the electrical service wires to the motor being connected with the contacts of an oscillatory mercury tube switch 73. Said switch is oscillated or tilted by means of a bell crank lever 74, the short end of which is engaged by a pin on the stem 75 of the pressure actuated diaphragm. A coiled spring 76 urges pin 75 downwardly and it will be seen that when the pressure of the water supply exceeds a predetermined value, stem 75 will be raised, switch 73 will be tilted and the circuit through the motor will be opened.

*Operation*

The operation of the gas-impregnating or carbonating mechanism of my system is substantially similar to the operation of the apparatus disclosed in the hereinabove identified Patent No. 1,713,787. When impregnated water from tank 7 is withdrawn through the dip or discharge pipe P the pressure within tank 7 is of course immediately reduced, usually from 2½ pounds to 5 pounds, depending on the diameter of the discharge opening. Water of course is supplied to tank 7 through conduit 26, connection 25, annular water passage 19 and ports 20 as fast as the impregnated water is drawn out, the reduced pressure in tank 7 permitting the spring-pressed water control valve 14 to be forced open by the predominating pressure from the water supply. The reduction of pressure in tank 7 upon the withdrawal of impregnated water is immediately communicated to the upper side of diaphragm 37 through passages 49 and 49a and pressure chamber 33, and the predominating pressure from the water supply exerted on the under side of diaphragm 37 by means of ports 51 and 51a is sufficient to raise the diaphragm and with it gas valve 31, thereby unsealing the gas supply nipple 30 and permitting the gas to pass through the orifice in the nipple through valve-containing chamber 23 and through gas supply passages 24 and 15b and into the mixing chamber 11 through the lateral discharge ports 15c, the combined water and gas being violently agitated in mixing chamber 11 and discharged into the tank 7 through a series of depending ports 9b. As soon as the draft or discharge apparatus from the tank is shut off, the pressure in the tank will quickly return to normal. The tank pressure is transmitted by passages 49 and 49a to the upper side of diaphragm 37 and operates to shut off the supply of gas. The increased pressure built up in the tank added to the pressure exerted by the coiled spring 18 holds the water discharge 14 closed and the impregnating mechanism remains in a balanced condition until impregnated liquid is again drawn from the tank.

The said carbonizing or gas impregnating mechanism is entirely adequate and highly efficient where the pressure of the water supply does not fluctuate materially.

My improved system, however, functions efficiently to accurately impregnate or carbonate the liquid even where fluctuations in the pressure of the water supply exceeds 40 pounds per square inch.

If the pressure of the water supply to the pump casing is substantially normal or above a pre-determined point, pump motor will not operate and water will pass through the arcuate groove 59a in pump casing drum 59, the pressure of this water being exerted upon the under side of the diaphragm in the pressure actuated circuit controlling mechanism E. This pressure raises the diaphragm stem 75 above the position illustrated in Fig. 6 and maintains the circuit through the motor in open condition.

As soon as the pressure of the water supply drops below a predetermined point the coiled spring 76 of the circuit controlling mechanism urges the diaphragm stem downwardly tilting the switch 73 and closing the circuit through the motor. The pump impeller is then driven at comparatively high speed and builds up a pressure upon the water supply to the carbonating mechanism adequate for the accurate impregnation and control of the mixture of gas and liquid. It will be seen, therefore that the pump is only operated when the water supply pressure is inadequate and current consumption for the motor is reduced to a minimum. When the pump is not in operation the particular construction of the impeller 55 and drum 59 having the groove 59a permits a substantially unrestricted flow of liquid through the pump to the impregnating or carbonating mechanism. The check valve 65 in the casting 64 preferably urged to closed position by an elastic member, such as the spring 66 has been found essential to the highly efficient operation of my system.

My improved apparatus functions efficiently without the use of a float valve controlling communication of pressure from the tank upon the upper side of the diaphragm.

It will also be noted that my improved device simplifies the structure of apparatus disclosed in the prior patents herein identified. Several of the conduits for communicating pressure to the diaphragm on the carbonating mechanism are eliminated, the float is eliminated and conveniently accessible means are provided for regulating the tension placed on coiled spring 18 which urges the water control valve 14 against its seat. This is an important improvement over the structures of the said prior patents, as it was necessary therein to remove the entire tank, mixing chamber and nozzle portion of the carbonating mechanism in order to regulate the water control valve.

With my improved device the water control valve may be adjusted by turning the upper projecting end of stem 15 by means of a key or turning implement 15a.

Turning of the stem 15 in addition to regulating the water control valve moreover will regulate within certain limits the supply of gas to the mixing mechanism in the following manner. If the tension upon spring 18 is lessened by turning stem 15, a greater proportion of water will be admitted into tank 7, thereby raising the pressure within said tank, and this increased pressure is transmitted to the upper side of diaphragm 38 through the passages 49 and 49a, tending to urge the gas control valve 31 against its seat. When the device is installed and properly regulated, the user, under ordinary circumstances, controls both gas and liquid supplies by manipulation of the stem 15 which projects above the top 7a of the tank.

In addition to the cooperative advantages of the particular type of pump utilized in my system, it will also be seen that no plungers or other mechanisms carrying oil, grease or other lubricants, are employed and that throughout the entire system there will be no chance for lubricants or oil to mix with the water. This is highly in carbonating apparatus.

From the foregoing description it will be seen that my improved apparatus or system is automatic, self-regulated and will effect a predetermined and accurate mixture of gas and water regardless of considerable variation in the pressure of the water supply. The apparatus can be adjusted to supply just sufficient gas to properly charge the water without wastage of the gas.

It will be further seen that the particular type of pump associated with the impregnating mechanism and circuit control cooperates closely with the said parts of the device to produce a highly efficient and unitary result.

The device, in addition to the functions previously described, may be successfully used for pumping water to a tank for farm or domestic uses at the same time it is utilized for carbonating or gas impregnating purposes.

In the latter event the valve 72 is opened and the pump will be made to operate to supply water for storage, watering or other domestic purposes as desired.

It will of course be understood that various changes may be made in the form, details and proportions of the parts without departing from my invention, which generally stated, consists in the novel parts and combinations of parts and devices disclosed in the foregoing specifications and pointed out in the appended claims.

What is claimed is:—

1. In apparatus for impregnating liquid with gas, a tank, a discharge connection therefor, liquid and gas supply connections thereto, means responsive to the differences in the pressures of the tank and the liquid supply connection for controlling the supply of gas to the tank, a source of liquid supply under pressure, a pump interposed between said source and said liquid supply connection, said pump permitting the passage of liquid to said tank when inoperative and means for operating said pump when the pressure of said liquid supply falls below a predetermined point.

2. In apparatus for impregnating liquid with gas, a tank, a discharge connection therefor, liquid and gas supply connections thereto, means responsive to the differences in the pressures of the tank and said liquid supply connection for controlling the supply of gas to the tank, a source of liquid supply under pressure, a pump interposed between said source and said liquid supply connection to said tank, said pump being constructed to permit a substantially unrestricted flow of liquid to said tank when said pump is inoperative and pressure controlled means connected with said liquid supply for operating said pump when the pressure of said liquid supply falls below a predetermined point.

3. In apparatus for impregnating liquid with gas, a tank, discharge connection therefor, liquid and gas supply connections thereto, means responsive to the differences in the pressures of the tank and said liquid supply connection for controlling the supply of gas to the tank, a source of liquid supply under pressure, a pump interposed between said source and said liquid supply connection, said pump having a passage to permit a substantially unrestricted flow of liquid to said tank when said pump is inoperative, an electric motor for driving said pump and a pressure actuated circuit controller subjected to the pressure of said source of liquid supply for operating said pump when said pressure falls below a predetermined point.

4. In apparatus for impregnating liquid with gas, a tank, a discharge connection therefor, liquid and gas supply connections thereto, means responsive to the differences of the pressures of the tank and said liquid supply connection for controlling the supply of gas to the tank, a source of liquid supply under pressure, a pump interposed between said source and said liquid supply connection to said tank, said pump comprising a casing and a rotary impeller journaled therein, said casing including a passage opposed to the face of said impeller through which liquid may pass when said pump is inoperative and means for operating said pump when the pressure of the source of liquid supply falls below a predetermined point.

5. In apparatus for impregnating liquid with gas, a tank, a discharge connection therefor, liquid and gas supply connections thereto, a pressure actuated valve for controlling the supply of liquid to the tank, a pressure regulating valve for controlling the gas supply, connections between the actuating element of said regulating valve and the liquid supply connection and between the interior of the tank and said actuating element respectively whereby a predetermined reduction in the tank pressure will cause the operation of the pressure regulated valve to admit gas to the tank, said liquid regulating valve having a stem which projects through a portion of said tank, an abutment means on said stem, an elastic means interposed between said abutment means and said valve, said stem being adjustably mounted whereby the tension of said elastic element may be varied by manipulating the outer end of said stem from without said tank.

In testimony whereof I affix my signature.

LESLIE STINSON.